May 13, 1969 D. L. HALL ET AL 3,443,667

ELEVATOR DEMAND MEMORY

Filed Feb. 29, 1968 Sheet 1 of 2

INVENTORS.
DONIVAN L. HALL
WILLIAM C. SUSOR
BY Wilson & Fraser
-atty's-

INVENTORS.
DONIVAN L. HALL
WILLIAM C. SUSOR
BY Wilson & Fraser
Att'ys.

United States Patent Office 3,443,667
Patented May 13, 1969

3,443,667
ELEVATOR DEMAND MEMORY

Donivan L. Hall, Toledo, and William C. Susor, Oregon, Ohio, assignors, by mesne assignments, to The Reliance Electric and Engineering Company, Cleveland, Ohio, a corporation of Ohio Original application Oct. 8, 1965, Ser. No. 493,973. Divided and this application Feb. 29, 1968, Ser. No. 709,254
Int. Cl. B66b *1/22*
U.S. Cl. 187—29 11 Claims

ABSTRACT OF THE DISCLOSURE

An elevator landing call storage element individual to a car for utiliaztion in plural car elevator systems having means to assign registered landing calls to individual cars independently of the proximity of the cars to the landings.

CROSS REFERENCE TO RELATED APPLICATION

This invention relates to elevator controls and is a division of application Ser. No. 493,973 which was filed Oct. 8, 1965, in the names of Donivan L. Hall and William C. Susor, and is entitled "Elevator Controls." More particularly this invention relates to an element for storing landing calls assigned to an individual elevator car.

BACKGROUND OF THE INVENTION

The usual plural car elevator control includes means for registering landing calls which are common to all of the cars until a car reaches the slowdown position of the landing of a registered call while traveling in the direction of service of the call. Williams et al. Patent 2,066,921 of Jan. 5, 1937, entitled, "Elevator Control System," disclosed a plural car control which established a zone of floors which were made available to a car on some limited basis so that the registration of a landing call for a floor in the zone while it is assigned to a car caused the landing call for that floor to be assigned that car. Each car in the Williams et al. type of system had a relay which was latched to indicate a landing call assignment and was released by response of the car to the call. Smart Patent 2,114,506 of Apr. 19, 1938, entitled, "Controlling System for Electrically Operated Lifts," discloses a system for selecting a registered landing call for assignment, then selecting the car having the least travel distance to the landing of the call when it approaches the landing in the service direction of the call, and assigning the selected call to the selected car by energizing a relay individual to the car, to the landing of the call, and to the service direction of the call. As in the Williams et al. system the response of the assigned car to the call releases the relay representing the call assignment.

SUMMARY OF THE INVENTION

The present invention utilizes a memory element, advantageously a static switching means such as a solid state flip-flop, having a plurality of setting inputs and a plurality of resetting inputs as a means of storing the assignment of a landing call to an elevator car. One system for establishing the assignment of a landing call to a car is illustrated in application Ser. No. 493,973 as noted above.

An object of the invention is to improve multicar elevator controls.

Another object is to enable registration and cancellation of the assignment of landing calls to individual cars.

A third object is to facilitate call assignments to individual elevator cars when service conditions in the system are altered, as where a car is delayed or excessively burdened by its service requirements, whereby a new assignment of the call can be made.

A fourth object is to enable the assignment of landing calls by a call assignment system which considers service criteria or by the prior registration for the car of a car call for the landing of the registered landing call.

In accordance with the above objects this invention lends itself to use in an elevator control system including means for cancelling call assignments when the predicted service capability of a car is altered as by a change in the service requirements or conditions. Landing calls are stored in a first storage in which they are retained until a car has served them. Once they are under assignment they are also stored in a memory individual to the car subject to assignment. This second memory is cancelled with the first when the call is served. It also can be cancelled by a service condition, particularly a loading of the car to capacity. When cancelled from the second memory, a call according to this feature is retained in the first memory and treated as a newly registered call which is selected, subjected to the assignment evaluation for the then current conditions and then associated with a car suitably situated with respect thereto.

A feature of this invention is the call memories for each elevator car and their adjuncts which enable the direct assignment of landing calls when a car call is coincided therewith. A car call can be assigned only to the car for which it is registered, hence it is directly entered into a memory for the car. If a landing call is registered which can be served by a car in serving an assigned car call the landing call and car are associated by a direct assignment process such that no selection of the call or evaluation of the service capability of the cars with respect thereto is required.

The exemplary system is arranged to release assignment of all landing calls except those corresponding to car calls for the car under conditions which would lead to a delay in the response of the car to calls. If a car were held unduly at a landing the assignment would be released. Similarly if it were loaded to a predetermined level approaching its capacity, its response would be delayed or its service even prevented and assignment released. When thus released, calls are reassigned to those cars capable of accepting them and responding to them without delay. Reassignment is accomplished by the means employed for the initial assignment.

BRIEF DESCRIPTION OF THE DRAWINGS

The above and additional objects and features will be more fully appreciated from the following detailed description when read with reference to the accompanying drawings in which.

DESCRIPTION OF THE PREFERRED EMBODIMENT

Figure 1:
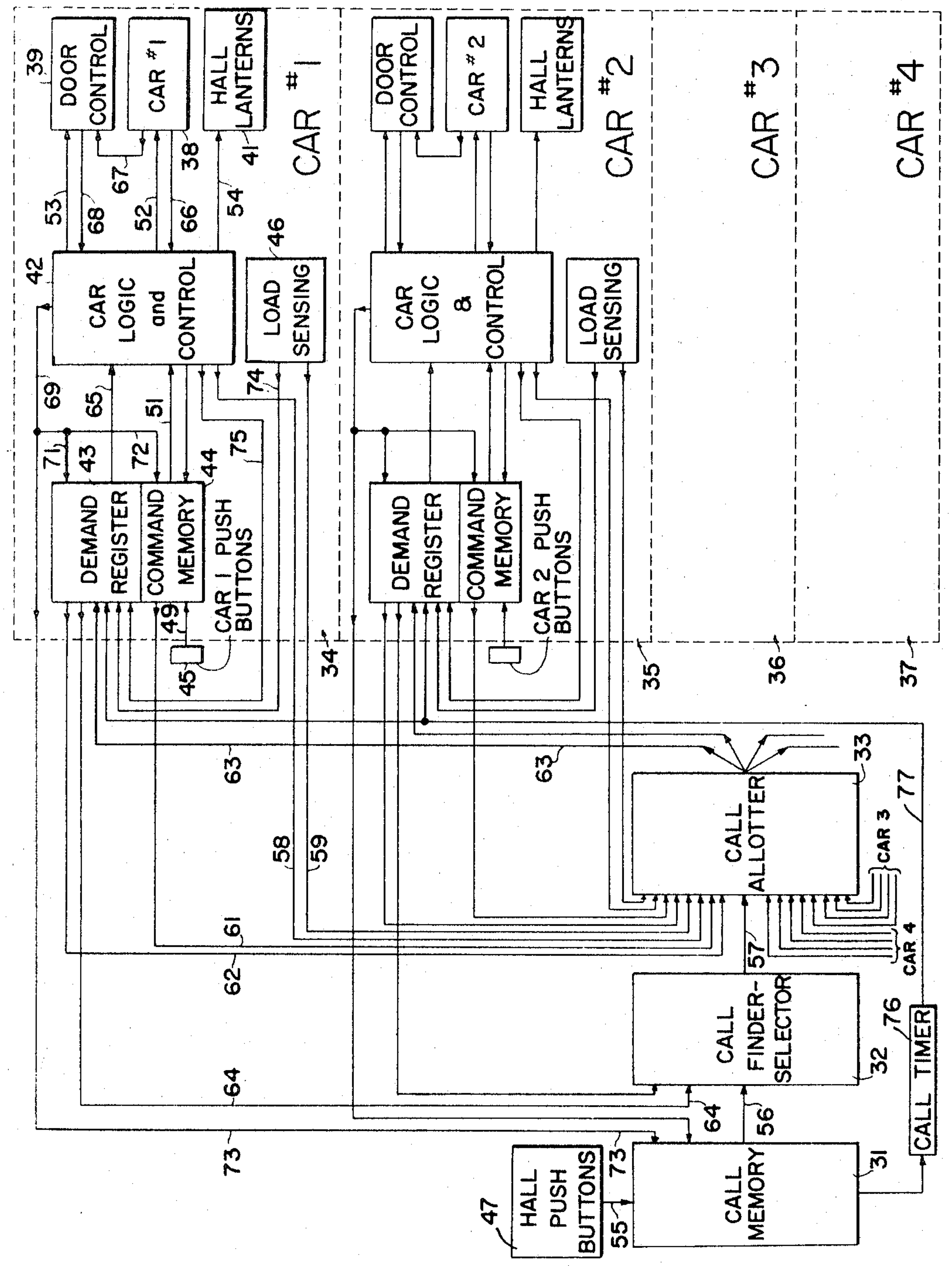
FIG. 1 is a functional block diagram of an elevator system with which the present invention can be utilized including subdivided block diagrams representative of a set of functional elements for typical elevator cars.

The invention has been illustrated in application Ser. No. 493,973 as applied to a ten landing structure served by four elevator cars. An up hall call switch is located at each of the first through ninth landings, and a down hall call switch is located at each of the second through tenth landings to enable prospective passengers to register hall calls as at 47 of FIG. 1. Each car is provided with a car call switch for each landing as at 45 of FIG. 1.

Individual car control can be accomplished by several means. However a preferred control is typified by that disclosed in United States patent application Ser. No. 380,385 of Donivan L. Hall et al. filed July 6, 1964 for Elevator Control wherein the elevator car is controlled by externally supplied start, direction and destination signals supplied in the present instance from the supervisory control. The car control provides the supervisory control with a signal indicating the final stop in a normal slowdown sequence for the car at all times so that when a destination signal is matched slowdown is initiated and the car follows a slowdown pattern to stop at its destination. In addition to the initiating signals interchanged between the car controls and the supervisory control there are several secondary or permissive signals interchanged as that enabling the hall lantern to be lighted and that indicating the car and hall doors are closed. Thus in general the car control is maintained separate from the supervisory control and the interlinkages between those controls heretofore afforded by the various circuits commutated by the floor selector mechanism of each car are not required in the present system.

The system to which the present invention can be considered is in three main sections. A call finder selects a call and locates it as a base from which the assignment of that call to a car proceeds. A call allotter considers the disposition of each car in the system with respect to the call located by the call finder and assigns either the closest car within a given limit of predicted service capability or the car predicted to be most favorably disposed to the call. The car logic senses the location and service requirements of the calls assigned the car and issues start, and directional signals to the car in a manner to cause it to serve those calls.

The illustrative disclosure has been abbreviated where possible by showing only representative examples for those circuits which are repeated. Demand memories have been constructed in circuit modules on a per floor and per car basis and accordingly a module for only one typical floor will be considered in detail. Modules have been segregated by dot-dashed enclosing lines in the drawings.

In a system of the type which will be considered below involving a plurality of similar elevator cars serving a plurality of floors at which similar functions are performed, the control circuitry follows relatively well developed patterns wherein for example the car functions for one car are duplicated for every other car and the control functions for any given floor are duplicated for every other floor with the possible exception of special landings. In view of this substantial amount of duplication and in an effort to simplify the disclosure of this invention where possible, typical circuits have been set forth in logic diagram form and where repetition of those circuits occurs, only blocks representing the circuits are depicted.

The demand memories have been illustrated with terminal number designations corresponding to the designations employed in application Ser. No. 493,973 and the connection of those terminals to the terminals of other circuits (not shown) has been indicated by reference characters characteristic of those destination terminals for those other circuits as shown in application Ser. No. 493,973 positioned adjacent the arrow-headed leads issuing from the illustrated terminals. Thus, as will be seen from a review of FIG. 2, a typical demand memory circuit for the ninth floor designated DM9 is illustrated in logic diagram form. That circuit is provided with a number of external terminals each of which is designated by a circle containing a numeral and positioned adjacent the dot-dash line embracing the circuit and in the lead to that terminal. A similar demand memory circuit is provided for floors 2 through 8 in the illustrative system and with minor revisions to accommodate terminal operations an additional circuit DM1 provides the demand memory for a down call at the top landing and an up call at the bottom landing. While some of the interconnections for the exemplary demand memories to external circuits are illustrated, the majority of the connections from its terminals are indicated by the designation of terminal code numbers on other circuits. Thus, for example, terminal 5 on circuit DM9 is connected to terminal 5 on circuit DM1 and receives an "Assign Up Call" signal from the car locating and gating circuit terminal 8 signified by the reference character CLG1–8 adjacent the arrow-headed lead at the bottom of the drawing.

Intercoupling of the modules of the present drawings has followed a uniform nomenclature wherein each module has a letter designation and each terminal of each module is numbered. On the drawings the terminals are shown as circles with their numeric designations within the circle. The modules have been designated on the drawings by their reference characters. Couplings from the terminals are indicated by designation of the module and terminal number to which a terminal is connected located adjacent an arrow-headed lead extending from the terminal. These designations are by the reference character of the module followed by a dash and the terminal number of that module.

In order to further facilitate an appreciation of this invention, the reference characters utilized to identify the major circuit components shown in application Ser. No. 493,973 and cooperating with the demand memories have been tabulated in alphabetical order together with a short functional name for those circuits.

| Symbol: | Functional name |
|---|---|
| CLG1 | Car Location and Gating Circuit, Cars **1** and **2**. |
| CM1 | Call Memory, 1st Up and 10th Down. |
| CM2–CM9 | Call Memory, 2nd to 9th. |
| COM1–COM5 | Command Memory, 1st to 10th. |
| CRG1 | Call Reset Gating, 1st Up and 10th Down. |
| CRG2–CRG9 | Call Reset Gating, 2nd to 9th. |
| DC | Distance Counter. |
| DD1 | Direct Drive Up. |
| DD2 | Direct Drive Down. |
| DD3 | Direct Drive-stop Up. |
| DD4 | Direct Drive-Stop Down. |
| DM1 | Demand Memory, 1st Up and 10th Down. |
| DM2–DM9 | Demand Memory, 2nd to 9th. |
| TSG1–TSG8 | Total Stops Gatings, Cars **1–4**. |

Inasmuch as logic elements such as flip flops, coincidence gates, anti-coincidence gates and inverters are available in many forms and are well known in the art, the structures of such elements for AND's, OR's, NOR's, MEMORY's and operational amplifiers have not been set forth in detail and the invention's circuits have been represented as logic diagrams rather than schematics.

While the functions of these elements can be accomplished in large part with electromagnetic switching, it is considered too slow for practical application wherein the entire call finding and allotting function is to be performed for a call in a matter of milliseconds. Accordingly, the system illustrated here employed solid state switching and logic elements.

*Description of FIGURE 1*

As depicted in FIGURE 1, a system to which this invention can be applied involves three major elements common to all of the cars represented by a call memory 31, a call finder-selector 32 and a call allotter 33. The exemplary system made up of four cars is illustrated in FIGURE 1 by car logic function groups for cars 1 and 2 broken down in functional block diagrams and for cars 3 and 4 represented by the general blocks wherein cars 1–4 are identified by blocks 34, 35, 36, and 37. The typical car logic functions for car 1 are illustrated within the major car block 34 and comprise the car itself 38 including its hoisting mechanism and the means for generating a car position signal, a door control for the car 39, and hall lanterns 41 for the car indicating the proximity of the car to a landing and its condition to both stop at that landing and to travel therefrom in a given direction. Each of the door control, car and hall lantern control blocks are coupled both to supply to and receive signals from a car logic control 42 which determines the starting, stopping and travel direction of the car in serving its assigned service requirements. Those requirements are supplied from a demand register 43 which indicates the landings at which the car will stop in response to assigned hall calls and a command memory 44 which retains the registration of the car calls registered within the control panel within the car represented by the block 45. Certain of the control functions as will be more fully understood hereinafter are provided by a load sensing means 46 for the car which can indicate the car loading in terms of either the number of passengers within the car or the weight of the load within the car, for example.

Service requirements are imposed upon the system by the means of hall call switches represented by the rectangle 47 and by car calls from the rectangle 45. Car calls are registered by conventional means within the car as displayed on control panels therein and are applied directly as represented on the path 49, to the command memory 44 for the respective car. In order to distinguish the response of a car to a car call from that response to a hall call, it will be convenient to consider a registered car call as a "command" inasmuch as the car must respond to such calls in order to clear them from the system and no other car can serve such calls. The hall calls are distributed among the cars by the call allotter 33 and as assigned by the allotter are termed "demands." Accordingly once a call has been registered, it is entered into a command memory and held there until it is cancelled by the response of the car to that call. The signals in command memory 44 are applied as over the path 51 to the car logic control 42 which in turn develops the direction, start and stop signals over path 52 to the hoist motor controls of the car represented by rectangle 38. The car logic control also develops the start, stop signal to the door control 39 over the path 53 and at appropriate moments in the operation of the car and preceding its arrival at the landing for which the call is registered, it issues a stopping position signal over path 54 to the hall lantern controls 41, over path 53 for door control 39, and over path 52 for the retardation of the hoist motor.

Operation of the car 38 causes a car position signal to be issued to the car logic control 42 over the path 66. As the car advances along the hatchway it comes to close proximity to a landing. It enters a region commonly termed a door zone and a door zone signal is issued over the path 67 from car 38 to door control 39. The door control 39 in turn issues door close and open signals to the car logic control over the path 68 at approximate points in the operating cycle of the car. In the particular example under consideration here, the closing of the care doors after the response of the car to either a demand or command causes the cancellation of that demand or command by issuing a reset signal from the car logic control 42 over the path 69. However, alternative call reset techniques can be employed such as the stop of the car, the opening of the doors or the initiation of door closing after stop.

A demand memory reset signal is passed over the path 71 to the demand register 43 and over the path 72 to the command memory 44. Storage of the hall call signal in the call memory 31 is also canceled at this time by a reset signal over the branch 73 from path 69.

When conditions arise which indicate that a car is unduly delayed in serving the demands and commands imposed upon it, the demands can be released and the hall calls from which they matured reassigned as demands on other cars. Two sources of an indication of such delayed service are shown. When the car is loaded in excess of some predetermined level, stops in response to demands would be unfruitful inasmuch as no room would be available in the car to transport the passengers waiting at the landings. On the other hand, where a demand and a command exist for the same floor, it is to be presumed that the stop of the car for the command will result in the discharge of at least one passenger and accordingly the creation of room for the acceptance of at least one passenger from the landing. Accordingly, when the load sensing control 46 develops a signal characteristic of a predetermined loading, a reallocation signal is issued over the path 74 to the demand register 43 whereby those demands which do not coincide with commands for the car are released. Similarly, when other factors delaying the car service develop, as sensed in the car logic controls, for example when the doors of a car are held open unduly at a landing, a delayed service signal is issued from car logic control 42 over path 75 to the demand register 43 to cancel the demands which do not coincide with commands. A further example of an undue delay is that occurring when a hall call is registered an excessive interval. A call timer 76 times the interval each call is retained in call memory 31. When the interval of registration exceeds a certain amount, a signal is issued on path 77 to remove the assigned call from its demand register and the timer 76 is reset or negated for further intervals for that call. The cancellation of the demands in the demand register corresponds to the registration of an unassigned hall call inasmuch as the hall call from which the demand was developed, remains registered in the call memory 31 until a car has responded to that call by satisfying its demand. Accordingly, upon release by the demand register, the call again is fed to the call finder selector and from the call finder selector to the call allotter for reallotment to the cars in accordance with their ability to satisfy the calls. The supervisory control receives inputs from hall landing push buttons, car floor destination push buttons, car position signals and car loading controls. Outputs from the supervisory system are the start up or start down signals for each car, the stop signal for each car and the door control signals. Output signals to the hall push button indicator lights and hall lanterns are also provided. The car position signal comes from the car control which can be of conventional form or of the form shown in United States patent application Ser. No. 380,385 filed July 6, 1964 for Elevator Control in the name of Donivan L. Hall et al. The start up, start down and stop signals go to the aforenoted car control system.

The switches for registering hall calls represented by the rectangle 47 include up and down call switches for each landing but the terminal landings in the usual elevator system and an up call switch at the lower terminal landing and a down call switch at the upper terminal landing.

Once a hall call is registered, it is retained in registration by means of call memory 31 until it has been served. A call entered in the call memory, according to the present invention, is assigned to but one of the cars available in service, by means of the call allotter 33 through the intermediate function of the call finder selector which segregates calls within the memory in a serial relationship for assignment. Each call registration is entered into the call finder selector over path 56 in which it is serially selected for consideration by the call allotter and is transmitted to the call allotter as a signal indicating the location of the call and its required direction for service over path 57.

The call allotter ascertains the relationship of active cars in the system relative to the selected call and assigns a car which is suitably related to the selected call for expeditiously serving that call.

Registration of a call for service from a landing by a prospective passenger is made on a directionally selective basis by means of landing call buttons. Such calls are stored in call memories such as CM9 for the ninth landing until they have been cancelled by the response of a car stopping at the landing of the call and conditioned to depart therefrom in the direction of the call. Since landing calls are imposed in a random fashion and since they can be satisfied by any number of cars, those calls entered into call memories are allotted individually to the cars.

The stored landing calls in the call memories CM1 to CM9 (not shown), when not allotted, actuate the call finder ring counter (not shown) to cause it to step from landing position to landing position until it encounters a position for which a call to be allotted is registered. Thus, the call finder ring counter starts from the position of its previously found call and advances to the next call having a direction of service corresponding to the direction of advance. If the activated call memory coincides with the setting of the call finder ring counter, no advance of the counter occurs. When the ring counter reaches its limit of positions, the first and tenth positions in a ten landing elevator system, it reverses its direction of advance. If advancing in the direct sequence, one to ten, when the counter reaches ten it enters inverse sequence, ten to one. From the inverse sequence it is switched to the direct sequence after it has reached its first position. When the call memory of a registered hall call has been found, the call finder sets the scanning direction of the allotter scanner (not shown) so that the allotter scanner initially hunts downward from its position preset by the found call memory when the call is an up landing call and upward when it is a down landing call.

The allotting process involves predicting for each car the service capability of that car relative to the selected call assigning the selected call to that car which is either closest and has an acceptable service capability or is conditioned most favorable to serve the call. Call assignment is transmitted from the allotter path 63 to the demand register 43. Once demand register 43 receives the allotment of the call, it issues a signal on path 64 to release the call finder selector 32.

As in the case of the command memory, the demand register section of the car control issues signals over path 65 to the car logic control to indicate the location and direction of the demand whereby the car logic control can institute appropriate car starting and direction setting functions for the car control 38 over path 52. Two forms of an allotter have been proposed. In one the cars are considered serially. In the other they are considered broadside. The one establishes certain criteria for each car, imposes a first preferred limit on the criteria and interrogates each car to ascertain if it falls within acceptable limits. The sequencing of the cars for interrogation is established in the order of spacing of the cars from the call so that the car which is closest to the call is the first interrogated, the next closest is the next interrogated and so on. If no car is encountered which has criteria within limits, those limits are relaxed and a new interrogation cycle is initiated. Thus the allotter develops an assignment between the selected call and that car closest to the call and having an acceptable service capability with respect to the call as established by the criteria limit.

The second and preferred form of allotter compares the service capability of all cars and selects the car with the optimum capability. It does this by generating electrical signals for each criterion for each car, summing the signals for the criteria for each car, considering all summed signals simultaneously and selecting the car with the most favorable signal for assignment to the selected call. In ascertaining the service capability it also considers the separation of the cars from the call, the calls which the car is assigned, the loading of the car and the absennce of all call assignments to the car.

*Demand memories*

The assignment of a landing call by the allotter results in the introduction of that call into the appropriate demand memory for the car. Each car has a set of demand memories which develop and retain signals employed in the car drive logic until the call has been answered or until the service capability of the car has been altered to a degree indicating an impairment in its ability to serve the call. In the illustrative embodiment the demand memories have been modularized so that up and down memories for each landing except the terminals are combined in a signal module. This permits a single signal to be developed for both up and down demands where required for a given landing. The signals from demand memories are applied to the allotter in order to indicate the assignment of service requirements during the evaluation of the car's service capability. Once a demand memory is activated, it locks out operation of the call finder and allotter to subsequently registered landing calls for that landing and service direction. They are also applied to the car drive logic to control the start and stop of the car. Signals are applied to the demand memories from the call finder and the call memories to identify a call to be assigned, from the allotter to define the assignment of up and down calls, from the command memories under certain circumstances to indicate a coincidence of a car call for the landing when the car is set for the service direction of the landing call, and from the call reset gating for resetting the demand memories in response to the answering of the call by the car.

The demand memory for the terminal landings is similar to that for the other landings except that the output signals to the car drive logic circuits are maintained separate.

Figure 2:
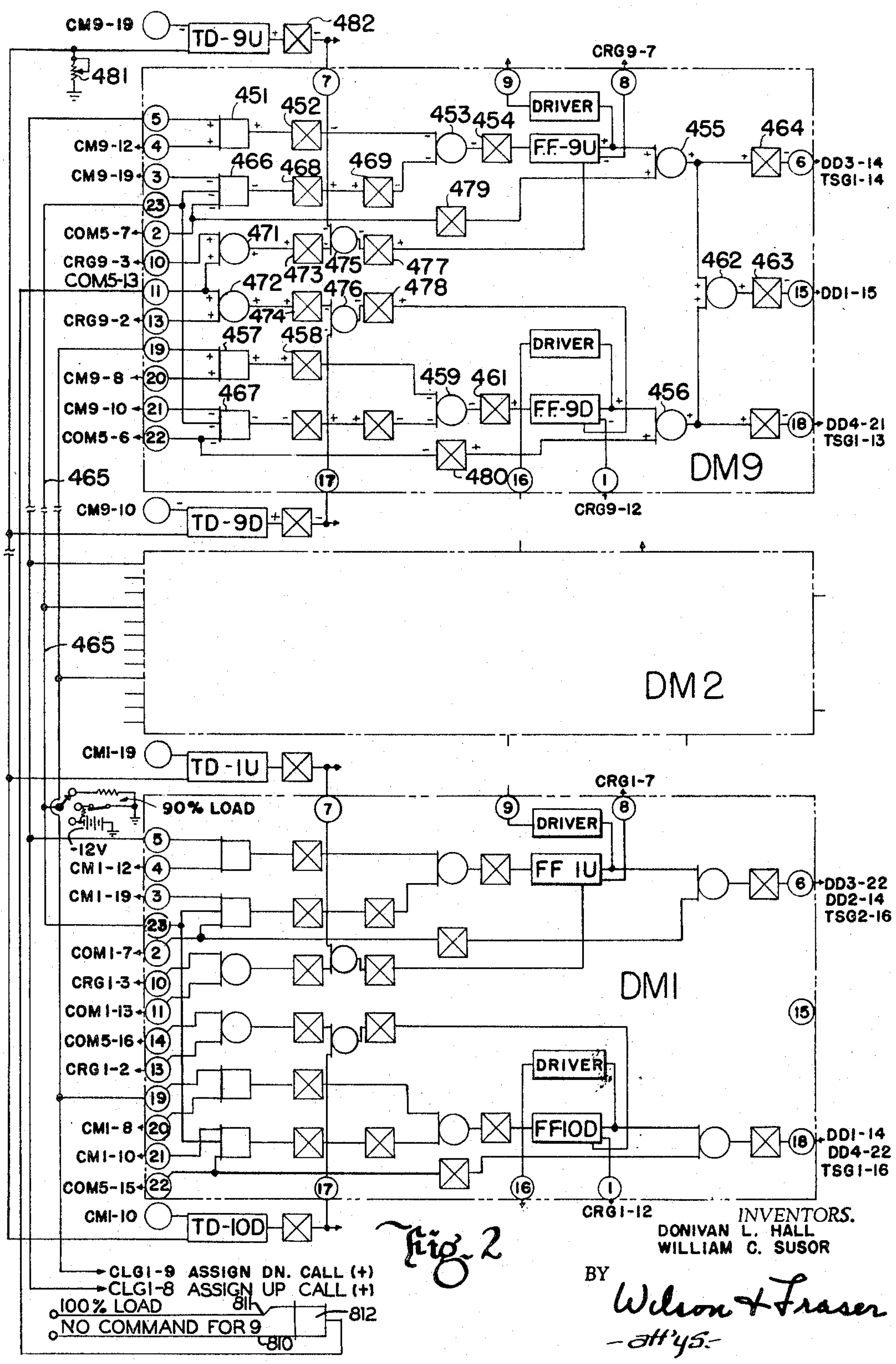
FIG. 2 is a logic diagram of the demand memories for a typical car for the terminal landings DM1 and a typical intermediate landing DM9 together with a block representation of another typical demand memory DM2.

The demand memories typical for a car are illustrated in FIG. 2 including logic diagrams for those for a typical landing intermediate the terminals, and for the terminal landings, together with a dot-dashed rectangle representative of the demand memories for a second landing.

*Description of FIG. 2*

Registration of a landing call in its call memory coupled with the selection of the call by the call finder results in the imposition of a signal on the corresponding demand memory for each car. Thus an up landing call for the ninth landing causes a positive signal to issue from CM9–12 (not shown) to DM9–4 and the lower input of AND 451 in the ninth demand memory of each car. The allotter as an incident of its allotting function removes the inhibit signal from all of the assigned car's up demand memory AND's corresponding to 451 by a positive "assigned up call" signal from CLG1–8 (not shown) to terminal 5, in this case DM9–5. AND 451 when gated passes a positive signal to inverter 452 which advances a gating signal to OR 453. The gated OR 453 actuates flip flop FF–9U through inverter 454 whereby a positive signal is issued to an associated driver to operate indicator lamps (not shown), and to OR 455. OR 455 issues signals to the direct drive car logic circuits and the allotter. Flip flop FF–9U produces a negative signal on its second output lead at DM9–8 to provide "an up demand present" signal in the call reset gating circuit (not shown) at CRG9–7 for car 1.

A down landing call at the ninth landing in a similar manner gates OR 456 to issue demand memory signals to the direct drive car logic and allotter. It applies an enabling signal from call memory at CM9–8 to AND 457 which is gated by the removal of its inhibit signal when the "down call assigned" signal for car 1 is issued by the allotter at CLG1–9 (not shown) to CM9–19. Inverter 458 gates OR 459 which triggers flip flop FF–9D through inverter 461. When the ninth down demand flip flop FF–9D is triggered, it actuates a driver to DM9–16 and a negative signal to DM9–1 to provide a "down present" signal in the call reset gating circuit for that landing at CRG9–12 for car 1, and gates OR 456.

Either an up or a down demand memory signal for the ninth landing gates OR 462 from OR's 455 or 456 to provide a signal to the direct drive car logic (not shown) through inverter 463, DM–9 and DD1–15. An up demand produces a signal through inverter 464 and terminal DM9–6 to DD3–14 and the allotter total stops gating circuit (not shown) of car 1 at TSG1–14.

Entry of a command for a car can cause subsequently registered landing calls to be directly assigned to that car as demands without operation of the call finder and allotter. Such landing calls are directly applied from the call memories to the demand memories and are gated into those memories at AND's 466 and 467 if an enabling command is registered and a negative enabling signal is present on lead 465. A selector switch to lead 465 provides constant lockout of direct assignment in its upper position, car load control of lockout at its middle position wherein a load actuated switch is opened from ground to apply a negative signal at same predetermined load level, e.g. 90% of capacity, and a constant enabling of direct assignment in its lower position. It is to be appreciated that other service conditions within the system can readily be employed to enable the direct assignment of landing calls by a negative signal or to inhibit by a positive signal applied to lead 465. Thus under direct assignment of landing calls unnecessary assignments of calls and unnecessary stops of the cars are avoided. This type of operation is particularly desirable as the system approaches its capacity since the slight delays in response which may be introduced by the more intense use of individual cars is compensated for by the more efficient utilization of the system.

An overloading car releases demands for which there are no corresponding commands and where there is a corresponding command it retains the demand for that landing and service direction. Under such conditions the system will ordinarily have the loads so distributed that all effective elevators are at or near the overload condition. Thus it is assumed that if a car is assigned to stop for a command it will lose at least one passenger at the landing and will therefore be able to accommodate at least one passenger from the landing. A landing call is assigned directly to a car having a command under overload conditions as the best means of serving that call under saturated or near saturated conditions for the system.

A car call for a landing has no direction preference. If, however, the car is set for a given service direction a negative signal having a service direction setting is issued from the command memory (not shown). Thus, a ninth landing command for an up car issues a signal at COM5–7 and for a down car issues a signal at COM5–6 to AND's 466 and 467 respectively. Under the condition that direct landing call assignment is not inhibited and a command is registered in a car set for a given direction, as a ninth command in car 1 when that car is set for up service, the registration of an up ninth landing call as a negative signal from CM9–19 to DM9–3 gates AND 466 to trigger flip flop FF–9U. The resulting signal to inverters 468 and 469 gates OR 453 with the same results as the registration of an up ninth landing call assigned by the allotter through AND 451.

Once a demand is registered by the operation of a demand memory flip flop, either through the direct demand assignment of a command or by the call finder and allotter assignment of a landing call, further assignments are inhibited (by means not shown) in response to the signals from the flip flops, as at DM9–8 for a ninth up demand and DM9–1 for a ninth down demand. This inhibiting of the call finder and allotter is accomplished by the call reset gating and in the ring counter gating for the call finder ring counter.

Reset of the demand memories upon the response of the car to the landing call as by stopping at the landing while set to provide service in the call direction is accomplished in the call reset gating circuit (not shown). In the case of a ninth demand, the reset signal, a positive signal, is issued for up and down demands respectively at CRG9–3 and CRG9–2 and are applied through DM9–10 and DM9–13 to flip flop reset OR's 471 and 472 respectively and are passed by inverters 473 or 474 to OR's 475 or 476 and inverters 477 or 478 to the reset inputs of FF–9U or FF–9D respectively. Once the flip flops are reset they remove the call finder inhibiting "demands present" signal at DM9–8 and DM9–1 whereby subsequently registered landing calls for the ninth landing can institute the call finder and allotter functions.

Demand memories pass both command and demand assignments to the direct drive modules of the car logic and the total stops gating of the allotter at terminals 6 and 18. However, the reallotting functions are applied only to the demands and only in the case there is no corresponding command for the car. Therefore the demands are reset separately while command signals are sustained in the demand memories.

Registration of a command results in a negative signal at DM9–12 for an up nine command and at DM9–22 for a down nine command. This signal is passed by inverter 479 or 480 directly to OR 455 or 456. It is sustained by the command memory and is reset with the command memory. Thus the demand can be reset apart from the command.

Several modes are available for resetting the demands as outlined above. The response of the car to the demands by stopping at the landing of the demand while set for service in the direction required of the demand results in a reset from terminal DM9–10 or DM9–13 to OR's 471 or 472. A demand can also be reset from the command memory by a positive signal from COM5–13 to DM9–11 when reset conditions prevail and no command is registered for the landing. This signal also functions through OR's 471 and 472 to reset flip flops FF–9U and FF–9D. In particular when no command for the ninth landing is registered to impose a positive signal on lead 810 and a 100% load is imposed on the car to impose a positive signal on lead 811, a positive signal passes from AND 812 to COM5–13 and on lead 813 to DM9–11. Conversely if a command is registered to impose a negative signal on lead 810, even in the presence of a 100% load no positive signal is passed and no demand reset is accomplished by this means.

Another reset of the demands is caused to function by an excessive delay in response to a registered call. A time delay TD–9U is activated upon registration of an up ninth landing call as a negative signal from CM9–19. Similarly, every other landing call has an associated time delay as represented in FIG. 2. The time delays are adjusted by the magnitude of resistance to ground set in adjustable resistor 481. At the end of the time interval defined by the time delay a positive signal is issued to inverter 482 which passes a negative signal to OR 475 in the reset circuit for flip flop FF–9U. This time interval in the exemplary system has a range of from 40 seconds to 2 minutes. Thus if the landing call is not cancelled by service to the landing of the call by a car which departs from the landing in the service direction of the call within the interval of the time delay associated with its call registering device, the demand memory is cancelled and the call is again hunted by the call finder and allotted to the car most favorably conditioned to serve it.

It is noted that certain of the details mentioned herein are the subject of separate patent applications other than Ser. No. 493,973. An alternative allotter is the subject of an application for Elevator Controls filed Oct. 8, 1965 in the names of Donivan L. Hall, James H. Kuzara and William C. Susor, United States Ser. No. 494,194. The drive circuits are the subject of an application for Elevator Controls filed Oct. 8, 1965 in the names of James H. Kuzara and Orval J. Martin, United States Ser. No. 494,056.

The above described demand memory, while related to a particular system affording certain inputs for setting the flip flop of the memory and certain other inputs for resetting the flip flop lends itself to variations involving other inputs. Thus it is to be understood that the present disclosure is to be read as illustrative and not in a limiting sense.

What is claimed is:

1. A demand memory for storing a landing call for a given landing which is assigned to an elevator car of an elevator system including a plurality of cars serving a plurality of landings, comprising a logical AND gated by a coincidence of an assignment enabling signal for said car and a landing call registration for said given landing, a MEMORY which is set by the gating of said AND, and a reset for said MEMORY responsive to an altered service condition in said elevator system other than service to said landing by a car.

2. A combination according to claim 1 wherein said MEMORY is a flip flop of static switching elements.

3. A demand memory for storing a landing call for a given landing which is assigned to an elevator car of an elevator system including a plurality of cars serving a plurality of landings, comprising a logical AND gated by a coincidence of a landing call registration for said given landing and a car call registration for said given landing and said car of said demand memory, a MEMORY which is set by the gating of said AND, and a reset for said MEMORY responsive to an altered service condition in said elevator system other than service to said landing by a car.

4. A combination according to claim 3 wherein said MEMORY is a flip flop of static switching elements.

5. A combination according to claim 1 including a second logical AND gated by a coincidence of a landing call registration for said given landing and a car call registration for said given landing and said car of said demand memory, and means responsive to the gating of said second AND to set said MEMORY.

6. A combination according to claim 1 including means responsive to a predetermined loading of the car of said demand memory, and wherein said altered service condition is the predetermined loading imposed on said car.

7. A combination according to claim 1 including means to time the interval said landing call of said demand memory is registered, and wherein said predetermined service condition is the registration of said landing call for a given interval defined by said timing means.

8. A combination according to claim 1 including a logical OR coupled to said reset for said MEMORY, means responsive to a predetermined loading of the car of said demand memory to gate said OR, and means responsive to the registration of the landing call of said demand memory for a given interval to gate said OR.

9. A combination according to claim 1 including means for registering a car call for the car and said given landing of said demand memory, means responsive to a predetermined service condition imposed on said system, and a second AND coupled to said reset and gated by a coincidence of said predetermined service condition on said system and the absence of a car call on said registering means to reset said MEMORY.

10. A combination according to claim 1 including means predetermined service condition is a given loading on said car.

11. A combination according to claim 1 including means for registering a car call for the landing and the car of said demand memory, an output issuing a signal when said MEMORY is set, a logical OR coupled to and gated by said output or said registered car call registering means.

References Cited

UNITED STATES PATENTS 3,225,869 12/1965 Schibli .............. 187—29

ORIS L. RADER, *Primary Examiner.*

W. E. DUNCANSON, Jr., *Assistant Examiner.*

PO-1050
(5/69)

UNITED STATES PATENT OFFICE
CERTIFICATE OF CORRECTION

Patent No. 3,443,667 Dated May 13, 1969

Inventor(s) DONIVAN L. HALL and WILLIAM C. SUSOR

It is certified that error appears in the above-identified patent and that said Letters Patent are hereby corrected as shown below:

Column 5, line 58, "approximate" should be -- appropriate --;

line 61, "care" should be -- car --.

Column 8, line 1, "absennce" should be -- absence --.

Column 10, line 24, "DM9-12" should be -- DM9-2 --.

Column 12, line 24, "1" should be -- 9 --.

Signed and sealed this 16th day of July 1974.

(SEAL)
Attest:

McCOY M. GIBSON, JR.
Attesting Officer

C. MARSHALL DANN
Commissioner of Patents